United States Patent [19]
Jondrow

[11] Patent Number: 5,953,206
[45] Date of Patent: Sep. 14, 1999

[54] THERMAL DISSIPATION AND EMI SHIELDING STRUCTURE FOR NOTEBOOK COMPUTERS

[75] Inventor: Timothy J. Jondrow, Corvallis, Oreg.

[73] Assignee: Hewlett-Packard Company, Palo Alto, Calif.

[21] Appl. No.: 08/951,191

[22] Filed: Oct. 15, 1997

[51] Int. Cl.$^6$ .................................. G06F 1/20; H05K 7/20
[52] U.S. Cl. ........................... 361/687; 361/692; 361/818
[58] Field of Search .................................... 361/687, 688, 361/689, 706, 704, 692, 705, 709, 818, 711, 708

[56] References Cited

U.S. PATENT DOCUMENTS

| | | | |
|---|---|---|---|
| 5,313,362 | 5/1994 | Hatada et al. | 361/709 |
| 5,383,340 | 1/1995 | Larson et al. | 62/259.2 |
| 5,483,418 | 1/1996 | Hosoi | 361/680 |
| 5,648,762 | 7/1997 | Ichimura et al. | 340/825.31 |
| 5,671,120 | 9/1997 | Kikinisi | 361/687 |
| 5,696,768 | 12/1997 | Harriman et al. | 371/21.1 |
| 5,777,847 | 7/1998 | Tokuno et al. | 361/705 |
| 5,781,412 | 7/1998 | De Sorgo | 361/704 |

FOREIGN PATENT DOCUMENTS

WO97/12313  4/1997  WIPO .............................. G06F 1/20

*Primary Examiner*—Lynn D. Feild
*Assistant Examiner*—Jagdish Patel
*Attorney, Agent, or Firm*—Timothy F. Myers; Curtis G. Rose

[57] ABSTRACT

A notebook computer has a lower housing with a keyboard and an upper housing with a display, a central processing unit (CPU), and a conductive plate. The CPU is attached directly to the conductive plate to achieve maximum heat transfer. The conductive plate is exposed to the air outside the notebook computer through air vents in the upper housing. Other heat generating elements in the upper housing are directly attached to thermally isolated islands within the conductive plate to allow each element to maintain a separate operating temperature while still conducting heat out of the notebook computer to the outside air. Additionally, the conductive plate is used as part of an electromagnetic interference enclosure to reduce unwanted radiation from leaving the notebook.

13 Claims, 7 Drawing Sheets

THERMAL DISSIPATION AND EMI SHIELDING STRUCTURE FOR NOTEBOOK COMPUTERS

BACKGROUND OF THE INVENTION

Speeds of central processing units (CPU) continue to increase causing computer manufacturers to incorporate them into their products in order to remain competitive. To take advantage of the faster CPUs, graphic controllers and memory devices also need to improve their performance. Notebook computer users now demand parity of performance with desktop computers and this equivalence need causes two serious problems for notebook manufacturers.

The first problem is that as CPUs get faster they consume more energy and become hot, as do the graphics controller and memory devices. The heat from the CPU and other components cause many problems. Hot notebook computers tend to fail more often than cooler notebook computers. This causes real concern among users, as their notebooks are becoming an essential need in their everyday work. When the notebook becomes too warm to touch, not only is it uncomfortable, but concerns are expressed about possible safety and fire hazards. There is even anecdotal evidence that one notebook melted and stuck to an airline seat food tray after a long flight and another that turned a yellow countertop brown.

Past attempts in solving the heat problem have included adding fans or heat pipes and slowing the processor. Adding a fan not only increases cost, it also takes up space and creates audible noise, which many users find distracting. Heat pipes are symbolically equivalent to water canals. They are able to move heat from one area in the notebook to another through a special channel. They too are costly and consume valuable space. Slowing the CPU can reduce heat but the performance of the CPU suffers equally, which fails to meet the users desire for desktop parity. Even if slowing is performed only during periods of idle activity, often times users want to run their notebooks at full throttle so no heat reduction is achieved. Multimedia applications and games are especially demanding in their need for full CPU performance. No user would want to watch a movie for 2 hours only to find their tabletop scorched from the heat of the notebook.

The other problem arising from faster processors is electromagnetic interference (EMI), which is unwanted radio wave emissions. These emissions cause interference with radios and other electronic devices, especially sensitive electronics found on airplanes. Because of the possible serious consequences, EMI radiation is regulated by governments worldwide and is rigorously enforced. It is becoming an increasingly difficult challenge to meet the regulatory requirements for EMI.

Most efforts to solve the EMI issue on products have been done on a trial and error method of test-fix-test-fix. This approach leads to longer product development cycles and late product introduction, thus keeping the latest technology out of the hands of notebook users. Many times the final EMI solution for a product is a hodgepodge of ferrite beads, metal tape, metal shields, foil wrap and special painted cases. The main difficulty in this approach is ensuring consistent EMI shielding to meet the government requirements when mass-producing products and encountering many variations in the different components.

International patent publication WO 97/12313 discloses a method of heat dissipation in a notebook computer by providing for a thermoplate in the lid assembly along with the electronic modules of the notebook. The thermoplate is attached directly to the back of the printed circuit assembly (PCA). The electronic modules themselves are not attached directly to the thermoplate. The electronic modules are facing the LCD panel. The heat from the electronic modules is transmitted to the circuit board through a high thermal resistance created by the PCA. The disadvantages of this approach are many. The first disadvantage is that all modules' heat is sent to a single reservoir, the thermoplate. However, some electronic modules generate more heat than others and may raise the temperature of these other modules outside of their temperature specification causing them to fail. A second disadvantage is that a thermal insulating layer is required to protect the LCD panel from being overheated from the electronic modules giving off heat from their top surface and a vented airspace is required to remove the heat which weakens EMI containment. A third disadvantage is that there is no seal to reduce EMI from radiating outside the lid assembly. The WO 97/12313 application does not address the difficult aspects of how to manage disparate heat sources to allow for individual thermal attention for each module, partition the electronics of the system, or deal with the EMI issues present in high speed notebook design.

SUMMARY OF THE INVENTION

A notebook computer has a lower housing with a keyboard and an upper housing with a display, a central processing unit (CPU), and a conductive plate. The CPU is attached directly to the conductive plate to achieve maximum heat transfer. The conductive plate is exposed to the air outside the notebook computer through openings in the upper housing. Other heat generating elements in the upper housing are directly attached to thermally isolated islands within the conductive plate to allow each element to maintain a separate operating temperature while still conducting heat out of the notebook computer to the outside air. Additionally, the conductive plate is used as part of an electromagnetic interference enclosure to reduce unwanted radiation from leaving the notebook.

DETAILED DESCRIPTION OF THE PREFERRED EMBODIMENTS

Figure 1:
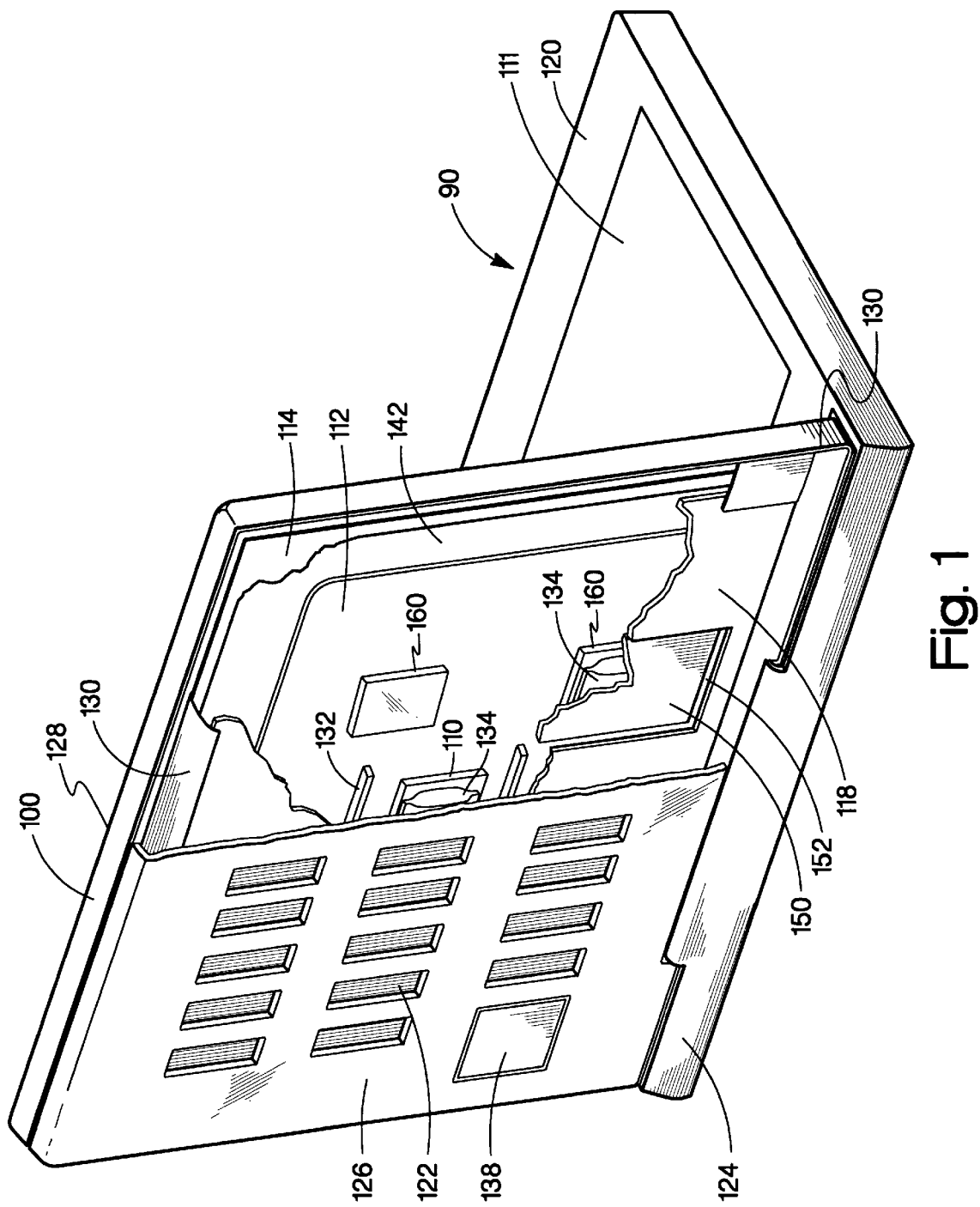
FIG. 1 shows the preferred embodiment of the invention with a view of the internal configuration of the upper housing assembly.

FIG. 1 shows notebook computer 90 that has upper housing 100 and lower housing 120. Upper housing 100 has front side 128 and back side 126. Back side 126 has thermal air vents 122 and memory access door 138. Upper housing 100 and lower housing 120 are connected through rotating housing mechanism 124. A cut-away is shown depicting the inside of upper housing 100 with conductive plate 118, logic board assembly 112, display shield 142, EMI seal 130 and display 114. Conductive plate 118 attaches to CPU 110 using thermal conduit 134 and to logic board assembly 112 using thermal foam 132. Also shown is thermal island 150 within conductive plate 118 surrounded by thermal insulation reef 152. Thermal island 150 is also attached to integrated circuit 160 (shown here to pictorially represent integrated circuits (ICs) on logic board assembly 112 other than CPU 110) with thermal conduit 134. Thermal conduit 134 transfers heat from CPU 110 and integrated circuit 160 to conductive plate 118. Although thermal conduit 134 could also be a solid copper slug with thermal compression gaskets, a metal spring, thermal foam, or heat tape; those skilled in the art will appreciate that other heat transferring devices could be used for thermal conduit 134 and would still fall within the spirit and scope of the invention.

Figure 2:
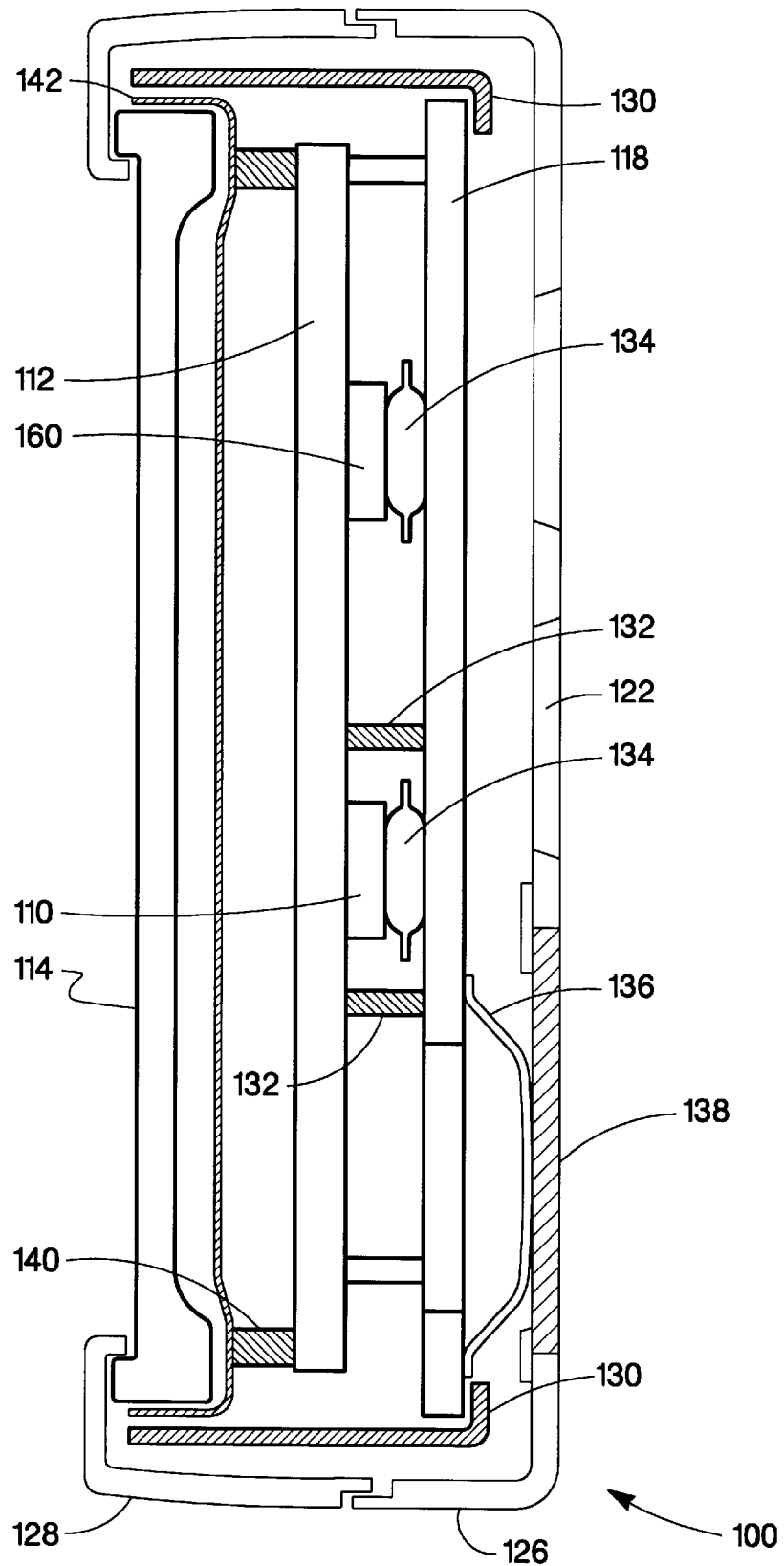
FIG. 2 shows a side detail of the upper housing showing the display, display shield, logic board assembly, conductive plate and upper housing encasement.

FIG. 2 is a side cut-away view showing upper housing 100 with display 114 which has a back enclosed with display shield 142. Logic board assembly 112 is separated from display shield 142 by insulator 140. The space created by insulator 140 prevents direct contact between display shield 142 and logic board assembly 112 circuit side, which may cause electrical shorts or inadvertent thermal transfer. Logic board assembly 112 is attached to conductive plate 118. EMI seal 130 seals logic board assembly 112 creating an enclosure to reduce EMI radiation. Conductive plate 118 contacts CPU 110 via thermal conduit 134 and thermal foam 132. When access is required to get to memory circuits 32, memory access door 138 can be removed. EMI shield 136 is used to maintain an EMI seal when memory access door 128 is in place. Heat is vented from conductive plate 118 to outside air through thermal air vents 122.

For optimal heat removal and system reliability, thermal conduits 134 provide a thermal method of attaching conductive plate 118 to the components on logic board assembly 112. Individual thermal attachments provide for heat removal while at the same time allowing for ease of manufacturing. The force exerted on the integrated circuit at heat contact point 162 (FIG. 4) needs to be sufficient for a thermal bond or else the IC may overheat. However, if the force is too great, there is the possibility that the IC may be damaged by mechanical stress. The method of attachment should preferably have some compressibility to reduce manufacturing problems due to operator error, mechanical tolerance and process variations such as solder height, component misalignment and printed circuit board warpage. As previously discussed, thermal conduit 134 is a compressible heat transferring material such as a fluid pillow, in the preferred embodiment, which provides a large cross-sectional area to remove heat. The fluid pillow is made of thin mylar or polyimide and filled with a heat conducting fluid such as water, but other compressible heat transferring materials could be used and be within the spirit of the invention.

To reduce EMI radiation, display 114 is shielded from the backside by display shield 142 (FIG. 2). This shield is then attached to conductive plate 118 assembly using EMI seal 130 to enclose logic board assembly 112. This seal uses metal tape in the preferred embodiment and metal clips in an alternate embodiment or a combination of both in yet another embodiment. This approach encloses the entire logic board assembly 112 within an effective EMI enclosure. Openings are allowed to have signals routed to the lower cover and display 114. Individual thermal islands 150 in conductive plate 118 are electrically attached for EMI purposes to the main structure of conductive plate 118 to reduce EMI leakage, which possibly could occur through thermal insulation reefs 152. In addition, layout of the IC components on logic board assembly 112 are preferably given particular attention to the routing and reduction of signal trace lengths to further reduce EMI radiation.

One design consideration, when attaching multiple integrated circuits to conductive plate 118, is observing the recommended operating temperature ratings for each IC. Typically, CPU 110, by virtue of its packaging design, can operate at a much higher temperature than devices such as graphics controller 22 (FIG. 6B). Many times when integrated circuits are operated outside their spec, the electrical specification can no longer be guaranteed and both long-term and short-term reliability are compromised. CPU 110, by itself, can provide sufficient heat energy to raise the temperature of conductive plate 118 such that the temperature of another IC attached to it is taken out of spec, causing it to fail or perform erratically. The preferred embodiment of this invention provides separate thermal islands 150 within conductive plate 118 to isolate those ICs which need to operate at a different temperature than CPU 110 yet maintains the EMI shielding properties. This isolation is performed using thermal insulation reefs 152 (See FIG. 3) which may be glass, plastic or other thermally minimal-conductive material.

Figure 3:
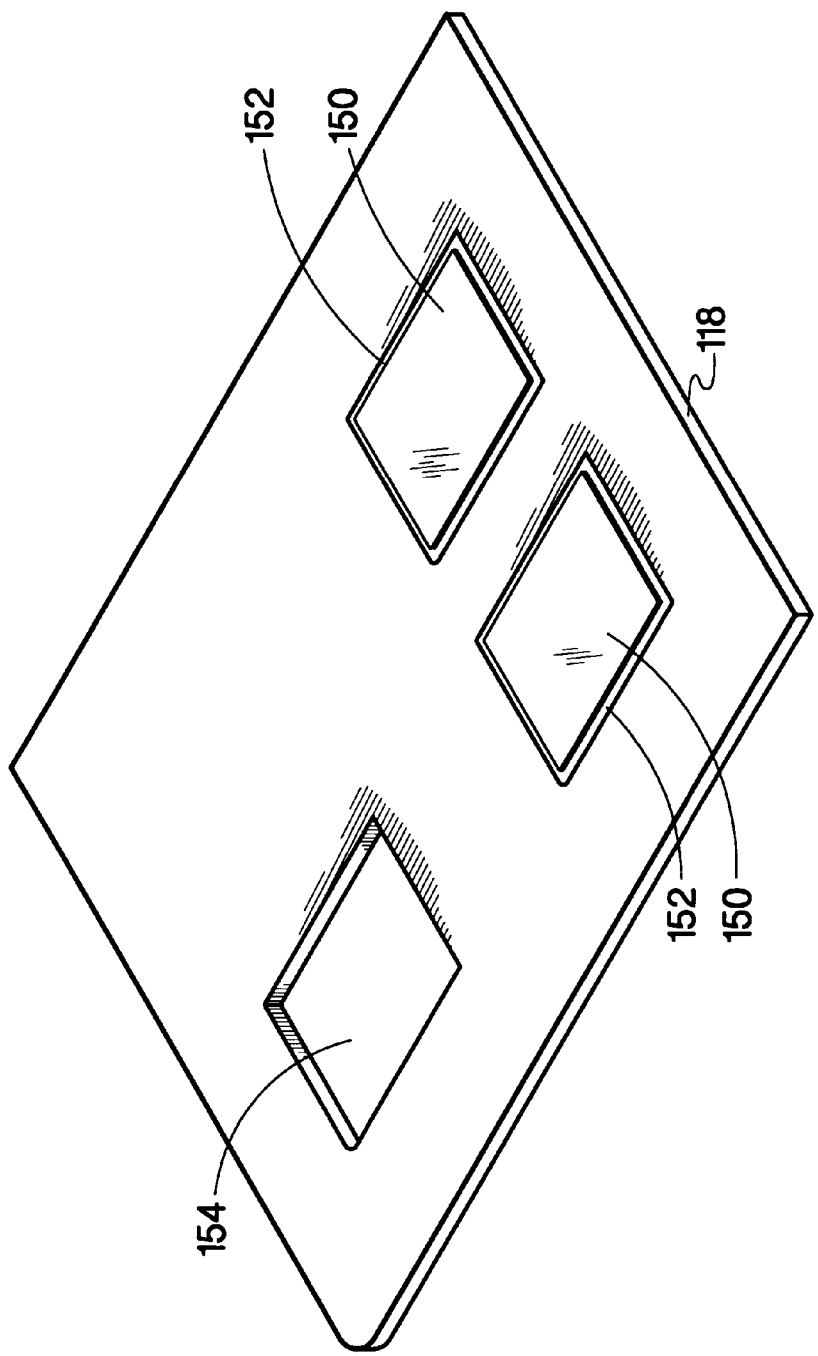
FIG. 3 shows a view of the heat dissipation structure with the individual islands used to thermally isolate different ICs as needed, and an opening for memory module access.

FIG. 3 shows conductive plate 118 with separate thermal islands 150 separated from conductive plate 118 with thermal insulation reefs 152. Also shown is memory module opening 154 used for access to logic board assembly's memory circuits 32 (FIG. 6B).

Figure 4:
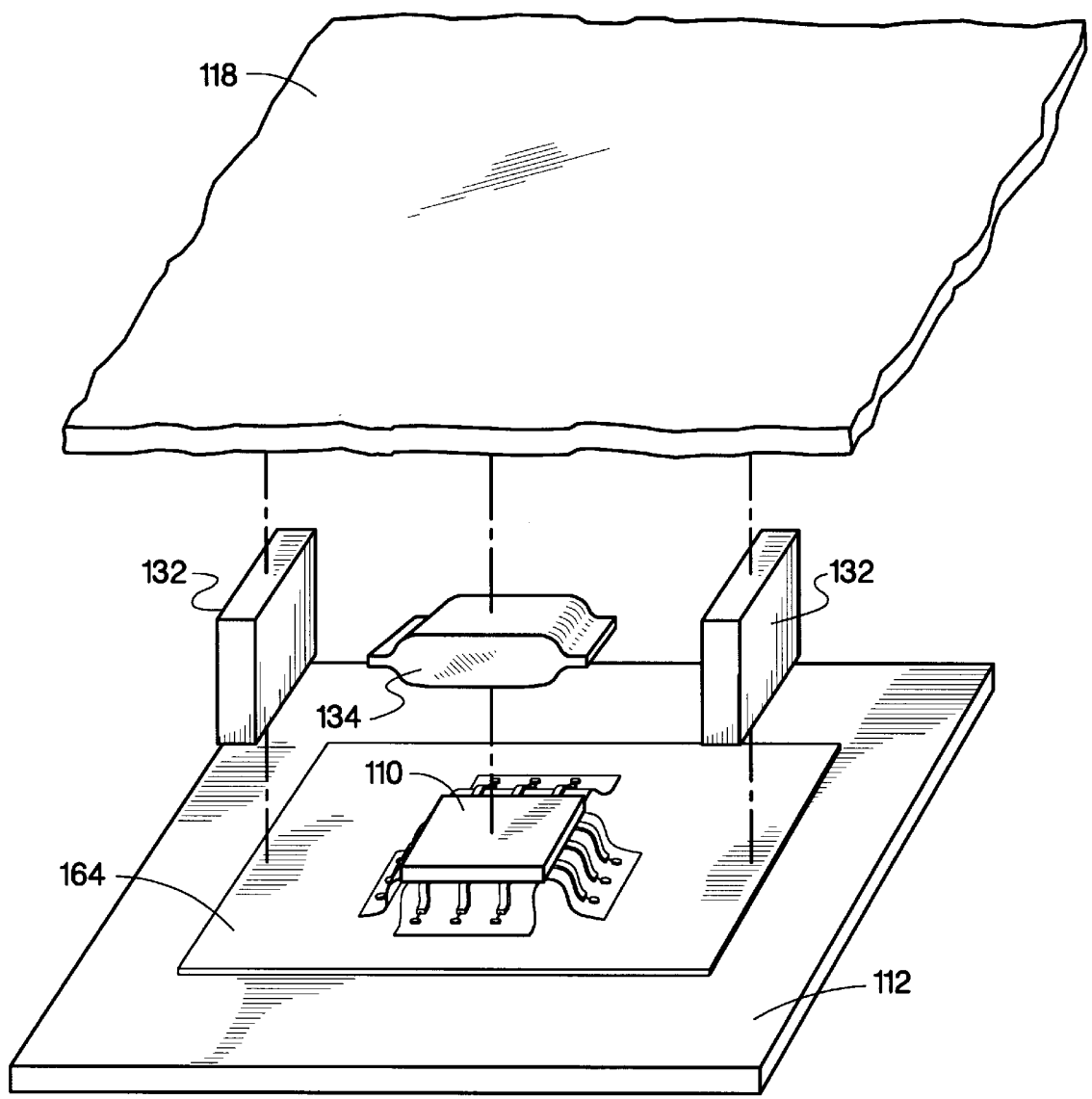
FIG. 4 shows a view of a typical integrated circuit (IC) on the logic board assembly and the logic board layout, used for thermal attachment, surrounding an IC.

FIG. 4 shows the preferred embodiment of how to extract heat away from CPU 110. Although CPU 110 is shown, this method is applicable to any logic component that resides on logic assembly 112, as represented by IC 160 in FIG. 1 and FIG. 2. Heat is removed from the top of CPU 110 to conductive plate 118 through thermal conduit 134. Thermal conduit 134 has a large cross-sectional area presented to both CPU 110 and conductive plate 118 which allows for a low thermal resistance to the flow of heat.

Figure 5:
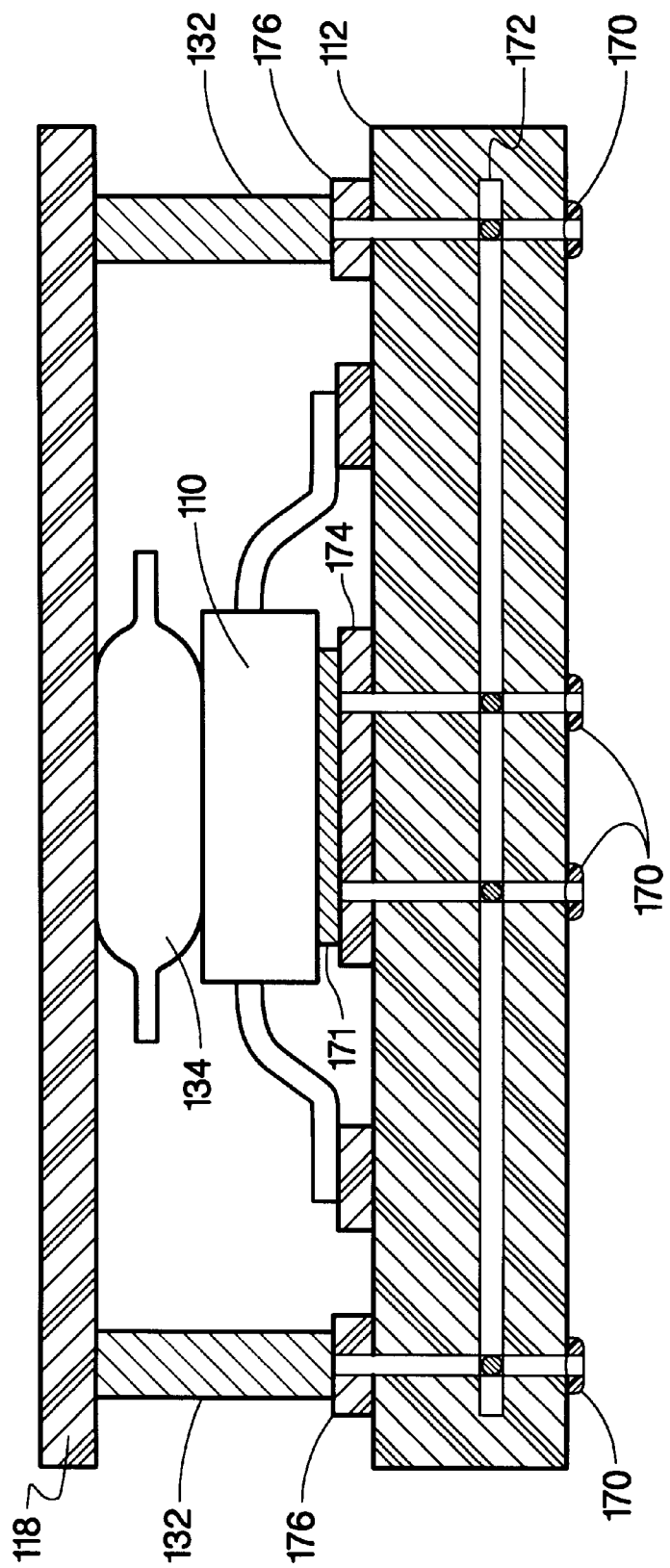
FIG. 5 shows a side view representing how an IC is attached to the logic board assembly and the attachment of the conductive plate to the IC and logic board assembly.

FIG. 5 shows an alternate embodiment of removing heat from the bottom of CPU 110 or IC 160. The bottom of CPU 110 is thermally connected to logic board pad 174 on logic board assembly 112 using heat tape 171 or thermal paste. Vias 170 draw the heat from logic board pad 174 and conduct it to logic board inner trace 172, which is then routed to additional vias 170 that conduct the heat back up to thermal pads 176. The heat is transferred to conductive plate 118 using thermal foam 132.

Figure 6A:
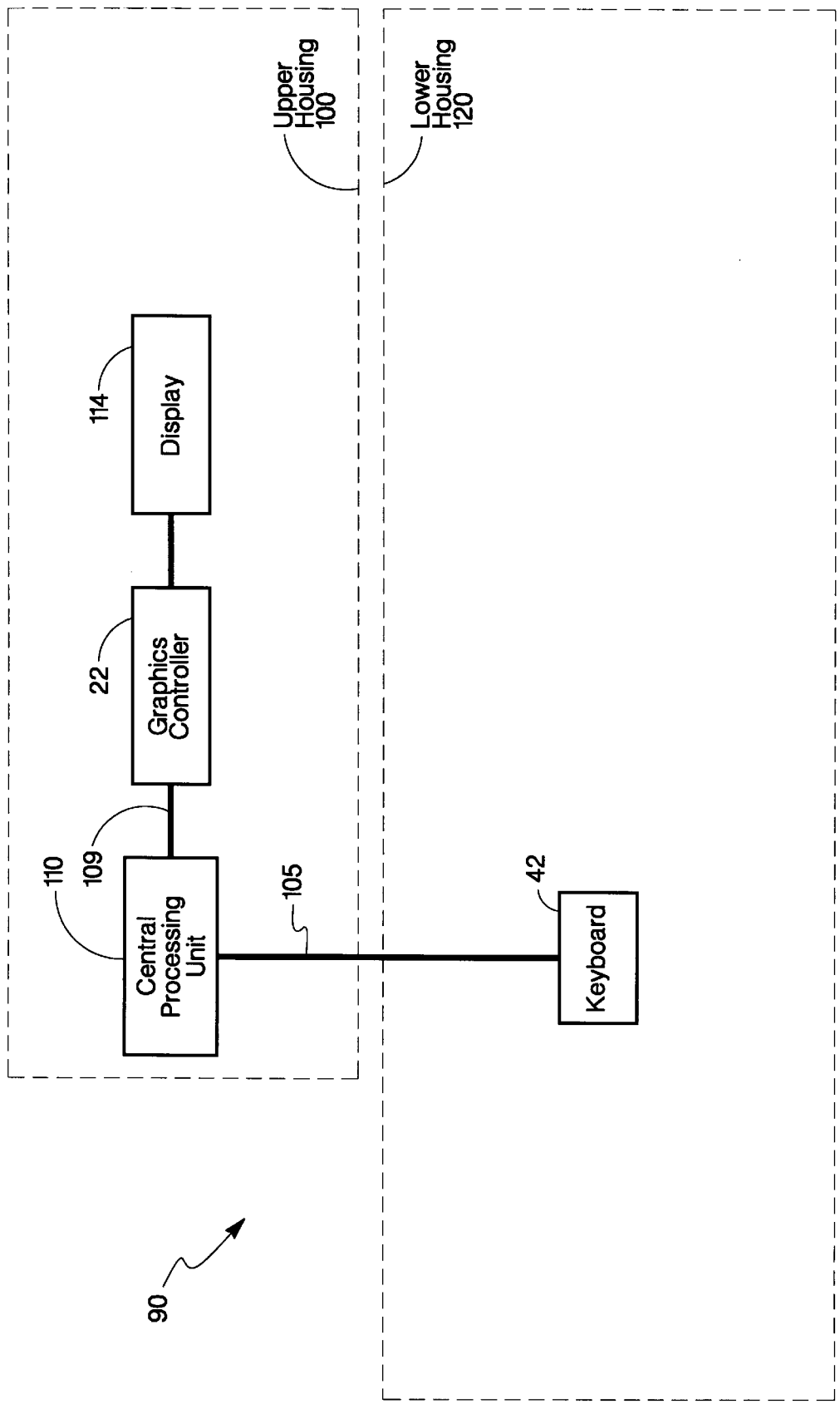
FIGS. 6A and 6B show block diagrams of the electronics and how it is partitioned to implement the preferred embodiment of the invention.
Figure 6B:
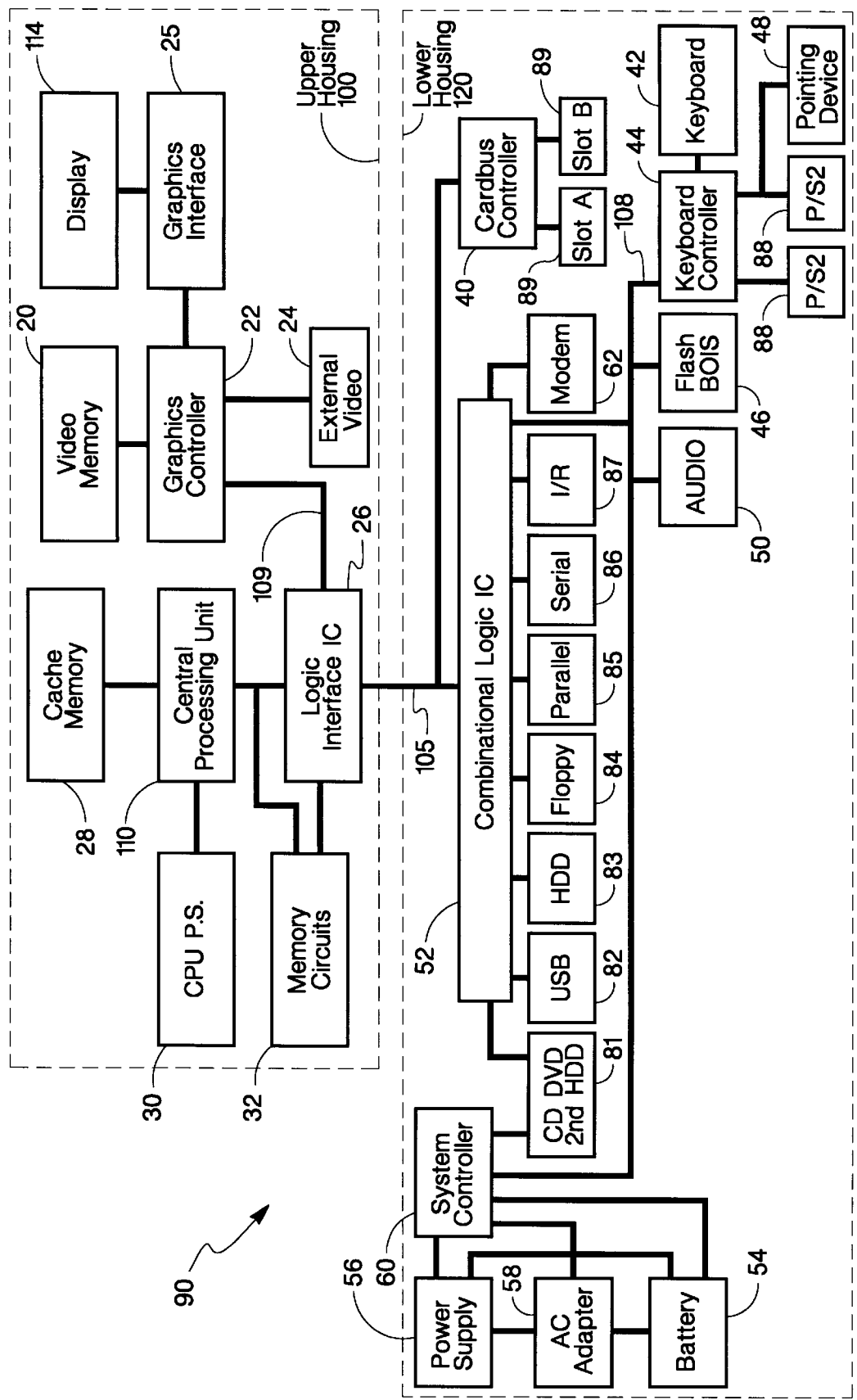

FIG. 6A shows a top-level block diagram of the preferred embodiment. FIG. 6B shows a block diagram showing the partition of logic used in the preferred embodiment. Other partitions are possible by those skilled in the art.

Upper housing 100 contains display 114, logic board assembly 112 (FIG. 1), and conductive plate 118 (FIG. 1) used to capture heat from the internal logic components and radiate it from notebook 90. Conductive plate 118 and its attachment to logic board assembly 112 also serves to shield and contain EMI produced by the internal logic. The conductive plate conducts both heat and EMI. It may be composed of a single section or aggregated from separate sections. The internal logic components comprise the core-processing center for notebook 90. They are CPU 110 and the following heat producing components: cache memory 28, memory circuit boards 32, logic interface IC 26, graphics controller 22, external video 24, video memory 20 and graphics interface 25, which is circuitry for interfacing graphics controller 22 to display 114. IC 160 is used as a generic representation of one or more of the internal logic components shown in upper housing 100 of FIG. 6B.

Graphics interface 25 operates at a very high speed and it is potentially a major contributor to EMI radiation. The preferred embodiment uses reduced swing (on the voltage), differential driven signals for graphics interface 25 to communicate to the display. Logic interface IC 26 is used to connect CPU 110 to memory circuits 32, graphics controller 22, and peripheral circuitry in the lower housing 120 via interface bus 105. Interface bus 105 is controlled using a clock that can be stopped when there is no communication between upper housing 100 and lower housing 120. This technique reduces the amount of EMI produced since interface bus 105 will be in an idle state for portions of time while notebook computer 90 is operating. Logic interface IC 26 also allows CPU 110 to talk directly with graphics controller 22 via high-speed bus 109. This bus is preferably an AGP (advanced graphics port) bus, which provides a higher bandwidth than PCI. Rotating housing mechanism 124 (FIG. 1) provides a channel to route interface bus 105 and power to the upper module from the lower housing 120.

The different heat producing components may be mounted individually or combined onto modules and mounted on logic board assembly 112 and still fall within the spirit of the invention. CPU 110 is typically an Intel Pentium, Pentium MMX or Pentium II processor in any IC package or in module form but could also be any other CPU chosen by those skilled in the art and still fall within the spirit and scope of the invention.

Most of the performance and visual qualities associated with notebook computer 90 are now contained in upper housing 100, allowing users to upgrade their notebook computers by exchanging upper housing 100 with a new version.

Lower housing 120 comprises the peripheral portion of notebook 90. Upper housing 100 and lower housing 120 are electrically connected using interface bus 105. A tuned and shielded interconnect cable or other wide-buss low-reflection transmission cable is preferably used as interface bus 105 to transfer signals to lower housing 120. The Peripheral Component Interface (PCI) bus has the advantage of being designed to operate in a transmission line environment. The mobile version of PCI, used as interface bus 105 in the preferred embodiment, allows for inactivating the bus clock when no data is being transferred which reduces EMI emissions. Another bus could be chosen by those skilled in the art and still meet the spirit and scope of the invention. Interface bus 105 interfaces to combinational logic IC 52 and cardbus controller 40 and cardbus slots 89. Other devices may be added to the PCI bus and still fall within the spirit and scope and spirit of the invention. Combinational logic IC 52 produces a secondary bus 108 used to connect to keyboard controller 44, flash bios 46, audio interface 50 and system controller 60. Combinational logic IC 52 also has separate signals to form interface ports to typical notebook I/O options, such as, CD-ROM or DVD bay 81, hard disk drive (HDD) 83, Universal Serial Bus (USB) 82, floppy drive 84, parallel port 85, serial port 86, I/R port 87 and modem port 62. Keyboard controller 44 controls keyboard 42, pointing device 48 and PS/2 ports 88. System controller 60 controls enabling power from AC adapter 58 or battery 54 to power supply 56, which in turn provides power to components in upper housing 100 and lower housing 120. System controller 60 also determines when battery 54 should be recharged using power from adapter 58.

What is claimed is:

1. A notebook computer, comprising:
    a lower housing comprising a keyboard; and
    an upper housing having a front side and a back side, said upper housing further comprising;
        a display attached to said front side;
        a central processing unit (CPU) comprising a top surface and a bottom surface;
        a conductive plate attached through a thermal conduit to said top surface of said CPU, said conductive plate including a plurality of thermally isolated sections; and
        a bus for connecting said keyboard in said lower housing with said display and said CPU in said upper housing;
        a plurality of heat producing components connected to said bus for communicating with said CPU, said plurality of heat producing components attached individually to said thermally isolated sections of said conductive plate through a thermal conduit.

2. The notebook computer of claim 1, further comprising:
    an enclosure for sealing said CPU and said heat producing components to reduce electromagnetic radiation (EMI) radiation.

3. The notebook computer of claim 1, wherein said bus is Peripheral Component Interconnect (PCI) signaling on a tuned and shielded interconnect cable.

4. The notebook computer of claim 1, wherein said bus is Peripheral Component Interconnect (PCI) signaling on a wide-bus low-reflection transmission cable.

5. The notebook computer of claim 1, wherein said thermal conduit further comprises:
    a compressible heat transferring material to attach said top surface of said CPU to said conductive plate.

6. The notebook computer of claim 5, wherein said compressible heat transferring material is a fluid pillow.

7. The notebook computer of claim 1 wherein:
    said upper housing further comprises a printed circuit board having an outer trace;
    said bottom surface of the CPU is thermal coupled to said outer trace; and
    said outer trace is thermal coupled to said conductive plate.

8. A notebook computer, comprising:
    a lower housing comprising a keyboard;
    an upper housing having a front side and a back side, said upper housing further comprising;
        a display attached to said front side;
        a conductive plate having a main section and an island,
        a thermal insulation reef separating said island from said main section;
        an integrated circuit comprising a top surface and a bottom surface;
        said top surface of said integrated circuit attached to said island of said conductive plate through a thermal conduit; and
    a bus for connecting said keyboard in said lower housing with said display and said integrated circuit in said upper housing.

9. A notebook computer, comprising:
    a lower housing comprising a keyboard;
    an upper housing having a front side and a back side, said back side having a plurality of air vents, said upper housing further comprising;
        a display having a front surface and a back surface, said front surface exposed to said front side of said upper housing;

a display shield surrounding said back surface of said display;
a graphics controller;
a graphics interface for connecting said graphics controller to said display;
a central processing unit(CPU);
a first bus for connecting said graphics controller to said CPU;
a conductive plate comprising a main section and an island, said conductive plate exposed to air through said air vents of said back side, said CPU attached to said main section through a first thermal conduit;
said graphics controller attached to said island through a second thermal conduit;
a thermal insulation reef separating said island from said main section; and
an electromagnetic interference (EMI) seal connecting said display shield and said conductive plate to enclose said CPU and said graphics controller; and
a second bus for connecting said keyboard in said lower housing with said display and said CPU in said upper housing.

10. The notebook computer of claim 9, wherein said first bus comprises advanced graphic port (AGP) signaling.

11. The notebook computer of claim 9, wherein said second bus comprises Peripheral Component Interconnect (PCI) signaling.

12. The notebook computer of claim 9, wherein said graphics interface comprises reduced-swing differentially driven signals.

13. A notebook computer, comprising:
a lower housing comprising a keyboard;
an upper housing having a front side and a back side, said upper housing further comprising;
a display having a front surface and a back surface;
said front surface exposed to said front side of said upper housing;
a display shield surrounding said back surface of said display;
a logic board assembly between said display shield and said back side of said upper housing;
a conductive plate between said back side of upper housing and said logic board assembly, said conductive plate having a main section and at least one island;
a thermal insulation reef separating said at least one island from said main section;
an electromagnetic interference (EMI) seal connecting said display shield and said conductive plate to enclose said logic board assembly; and
a bus for connecting said keyboard in said lower housing with said display and said logic board assembly in said upper housing.

* * * * *